(12) United States Patent
Anton Eichelberger et al.

(10) Patent No.: US 10,659,351 B2
(45) Date of Patent: May 19, 2020

(54) DATAFLOW CONSISTENCY VERIFICATION (71) Applicant: Hewlett Packard Enterprise Development LP, Houston, TX (US)

(72) Inventors: Rafael Anton Eichelberger, Porto Alegre (BR); Juliano Cardoso Vacaro, Porto Alegre (BR); Julio Cesar Fernandes Correa, Porto Alegre (BR); Sebastien Tandel, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/061,835

(22) PCT Filed: Dec. 16, 2015

(86) PCT No.: PCT/US2015/066035
§ 371 (c)(1),
(2) Date: Jun. 13, 2018

(87) PCT Pub. No.: WO2017/105431
PCT Pub. Date: Jun. 22, 2017

(65) Prior Publication Data
US 2018/0367448 A1 Dec. 20, 2018

(51) Int. Cl.
*H04L 12/721* (2013.01)
*H04L 12/755* (2013.01)
*H04L 12/46* (2006.01)

(52) U.S. Cl.
CPC .......... *H04L 45/38* (2013.01); *H04L 12/4625* (2013.01); *H04L 45/021* (2013.01)

(58) Field of Classification Search
CPC .... H04L 45/021; H04L 45/38; H04L 12/4625
See application file for complete search history.

(56) References Cited

U.S. PATENT DOCUMENTS

| 8,504,687 | B2 | 8/2013 | Maffione et al. |
| 8,850,513 | B2 | 9/2014 | Park et al. |
| 9,143,419 | B2 | 9/2015 | Sampath et al. |

(Continued)

FOREIGN PATENT DOCUMENTS

| CN | 104767841 | 7/2015 |
| KR | 20150051185 | 5/2015 |

OTHER PUBLICATIONS http://eeweb.poly.edu/faculty/yongliu/docs/openstack_TR.pdf > Author:Xu, Y. et al. Date: Mar. 9, 2015 Title: Identifying State Inconsistency in Openstack.

(Continued)

*Primary Examiner* — Gary Mui
(74) *Attorney, Agent, or Firm* — Hewlett Packard Enterprise Patent Department (57) ABSTRACT

In some examples, a network controller includes a flow repository and a consistency verification engine. The flow repository may store a dataflow configuration previously specified by an application. The consistency verification engine may access the dataflow configuration from the flow repository, retrieve flow table entries from a flow table of a network device, identify an inconsistency between the dataflow configuration previously specified by the application and the flow table entries of the network device, and respond to the identified inconsistency.

17 Claims, 5 Drawing Sheets

(56) References Cited

U.S. PATENT DOCUMENTS

| | | | |
|---|---|---|---|
| 2008/0222290 A1* | 9/2008 | Le Moigne | H04L 63/101 709/226 |
| 2012/0213074 A1* | 8/2012 | Goldfarb | H04L 43/026 370/235 |
| 2014/0075498 A1* | 3/2014 | Porras | H04L 63/107 726/1 |
| 2014/0108632 A1 | 4/2014 | Narasimha et al. | |
| 2014/0269690 A1 | 9/2014 | Tu | |
| 2015/0023147 A1* | 1/2015 | Lee | H04L 45/38 370/216 |
| 2015/0089032 A1 | 3/2015 | Agarwal et al. | |
| 2015/0326425 A1* | 11/2015 | Natarajan | H04L 41/0654 370/216 |
| 2016/0006650 A1* | 1/2016 | Song | H04L 12/6418 370/329 |
| 2016/0006663 A1* | 1/2016 | Zhang | H04L 47/33 709/234 |
| 2016/0337247 A1* | 11/2016 | Yao | H04L 12/6418 |
| 2017/0201435 A1* | 7/2017 | Tan | H04L 41/085 |
| 2017/0289004 A1* | 10/2017 | Hu | H04L 29/06 |
| 2018/0152386 A1* | 5/2018 | Chen | H04L 47/122 |
| 2018/0248755 A1* | 8/2018 | Hecker | H04L 41/0816 |
| 2019/0007303 A1* | 1/2019 | Wackerly | H04L 45/22 |

OTHER PUBLICATIONS http://www.di.fc.ul.pt/~bessani/publications/ewsdn13-consistency.pdf > Author: Botelho, F. et al Date: Sep. 24, 2013 Title: On the Feasibility of a Consistent and Fault-tolerant Data Store for SDNS. International Searching Authority, The International Search Report and the Written Opinion, dated Dec. 16, 2015, PCT/US2015/066035, 11 Pgs.

* cited by examiner

DATAFLOW CONSISTENCY VERIFICATION

BACKGROUND

High speed communication networks form part of the backbone of what has become indispensable worldwide data connectivity. Within such communication networks, various network devices including endpoint devices and switching devices direct network traffic from source ports to destination ports, helping to eventually guide a data packet from a source to a destination. Improvements in the reliability and efficiency of these communication networks will increase the effectiveness of communicating data.

BRIEF DESCRIPTION OF THE DRAWINGS

Certain examples are described in the following detailed description and in reference to the drawings.

DETAILED DESCRIPTION

The disclosure herein describes systems, methods, devices, and logic that may support dataflow consistency verification. In particular, the features described herein may support verification that network traffic forwarding or processing requirements previously specified by applications are actually implemented and correctly effectuated by network devices in a communication network. The dataflow consistency verification features described herein may be applied to a software defined networking (SDN) architecture, and an SDN controller may implement dataflow consistency verification features to increase network reliability, verify that network devices are appropriately configured to process network traffic according to the specified requirements, and increase the efficiency of packet processing logic of the network devices.

Figure 1:
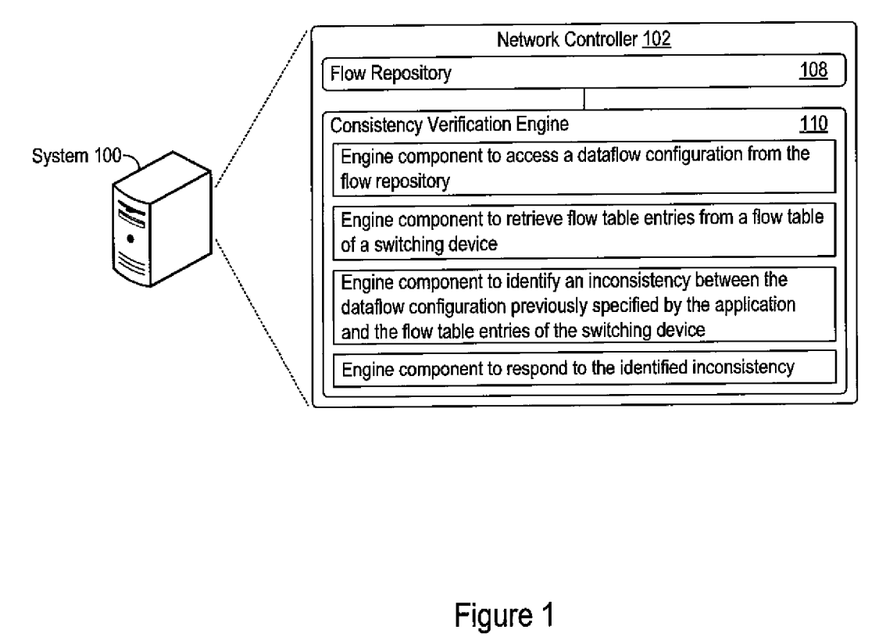
FIG. 1 shows an example of a system that supports dataflow consistency verification.

FIG. 1 shows an example of a system 100 that supports dataflow consistency verification. The system 100 may take the form of a computing system, including a single or multiple computing devices such as application servers, network devices, network controllers, compute nodes, desktop or laptop computers, smart phones or other mobile devices, tablet devices, embedded controllers, and more. The system 100 may be part of a communication network, and may thus take the form of an endpoint device, a controller device that manages switching functions in the communication network, network devices such as a switch, router, hub, gateway, an edge device, or any other device that transmits, receives, or otherwise controls the routing of data through the communication network.

The system 100 includes a network controller 102, which may be any physical or logical entity that manages network functions of a communication network. The system 100 may implement the network controller 102 (and components thereof) in various ways, for example as hardware and programming. The programming for the network controller 102 may take the form of processor-executable instructions stored on a non-transitory machine-readable storage medium and the hardware for the network controller 102 may include a processing resource to execute those instructions. A processing resource may take the form of single processor or multi-processor systems, and in some examples, the system 100 implements multiple engines using the same computing system features or hardware components (e.g., a common processing resource).

In some examples, a communication network managed by the network controller 102 is implemented and controlled through a software defined networking (SDN) architecture. The network controller 102 in these examples may implement an SDN controller. As an SDN controller, the network controller 102 may be physically separate from the network devices managed by the network controller 102. In that regard, the SDN architecture may decouple the system that makes decisions about where network traffic is sent (which may be referred to as a control plane) from the underlying systems that forward the network traffic to the selected destination (which may be referred to as a data plane). The SDN controller may control how network traffic is processed or forwarded based on traffic requirements or configurations specified by endpoint systems executing applications that communicate the network traffic (which may be referred to as an application plane). In some examples, the network controller 102 and managed network devices may, for example, support the OpenFlow protocol and exchange control plane communications according to the OpenFlow protocol. However, any other SDN protocol may be supported by the network controller 102 and managed network devices The network controller 102 may control how data traverses across the data plane. The network controller 120 may do so by determining and assigning data routes in the communication network for traffic flows and configuring managed network devices to route a particular dataflow according to a determined data route. The network controller 102 may thus assign network switching functions to managed network devices in the communication network, for example through flow table entries that specify matching criteria and an accompanying action to perform for network traffic that satisfies the matching criteria.

The network controller 102 may propagate flow table entries to various network devices in a managed communication network based on dataflow configurations specified by an application. A dataflow configuration may refer to any configuration, characteristic, accompanying action, or requirement for network traffic communicated across a communication network. Thus, example dataflow configurations may include a required level of quality of service (QoS), network paths for communicated traffic to traverse through, packet processing or security actions to perform on network traffic, flow dependencies or links to other dataflows, or any other rule, requirement, action, constraints or any other configuration to apply to network traffic. Dataflow configurations may thus specify network resources or requirements of an application that the network controller 102 provides through control and management of network devices in the data plane.

In some examples, a dataflow configuration specified by an application applies to a particular dataflow or a particular set of dataflows. A dataflow may refer to a stream of data (e.g., sequence of packets) communicated between a particular source and a particular destination. Thus, the application may specify dataflow configurations for dataflows communicated to various, different destinations (e.g., other applications, end hosts, devices, etc.) and do so on a per-dataflow basis.

As described in greater detail herein, the network controller 102 may verify that dataflow configurations specified by applications are actually implemented as flow table entries in network devices of a communication network. To do so, the network controller 102 shown in FIG. 1 includes a flow repository 108. The flow repository 108 may store dataflow configurations from any number of applications of the application plane, and the network controller 102 (or system 100 implementing the network controller 102) may implement the flow repository 108 as any type of combination of data structures, such as a table, list, or in various other forms. In FIG. 1, the flow repository 108 is part of the network controller 102. In other examples, the flow repository 108 may be remote or logically separate from the network controller 102.

The network controller 102 shown in FIG. 1 also includes a consistency verification engine 110. The consistency verification engine 110 may be a component of the network controller 102, and may thus take the form of hardware and programming or any other physical implementation form of the network controller 102. The consistency verification engine 110 may include various engine components through which the consistency verification engine 110 may verify that dataflow configurations specified by applications are properly (e.g., correctly, accurately, or consistently) implemented in network devices of a communication network. In the example shown in FIG. 1, the consistency verification engine 110 includes an engine component to access the dataflow configuration from the flow repository 108; an engine component to retrieve flow table entries from a flow table of a network device; an engine component to identify an inconsistency between the dataflow configuration previously specified by the application and the flow table entries of the network device; and an engine component to respond to the identified inconsistency.

An inconsistency between the dataflow configuration and flow table entries may occur when flow table entries of a network device cause the network device to process network traffic of a particular dataflow differently than as specified by a dataflow configuration applicable to the particular dataflow. Thus, the dataflow consistency verification features described herein may support increased effectiveness, reliability, or efficiency in network traffic communication. Some example features relating to dataflow consistency verification are described in greater detail next.

Figure 2:
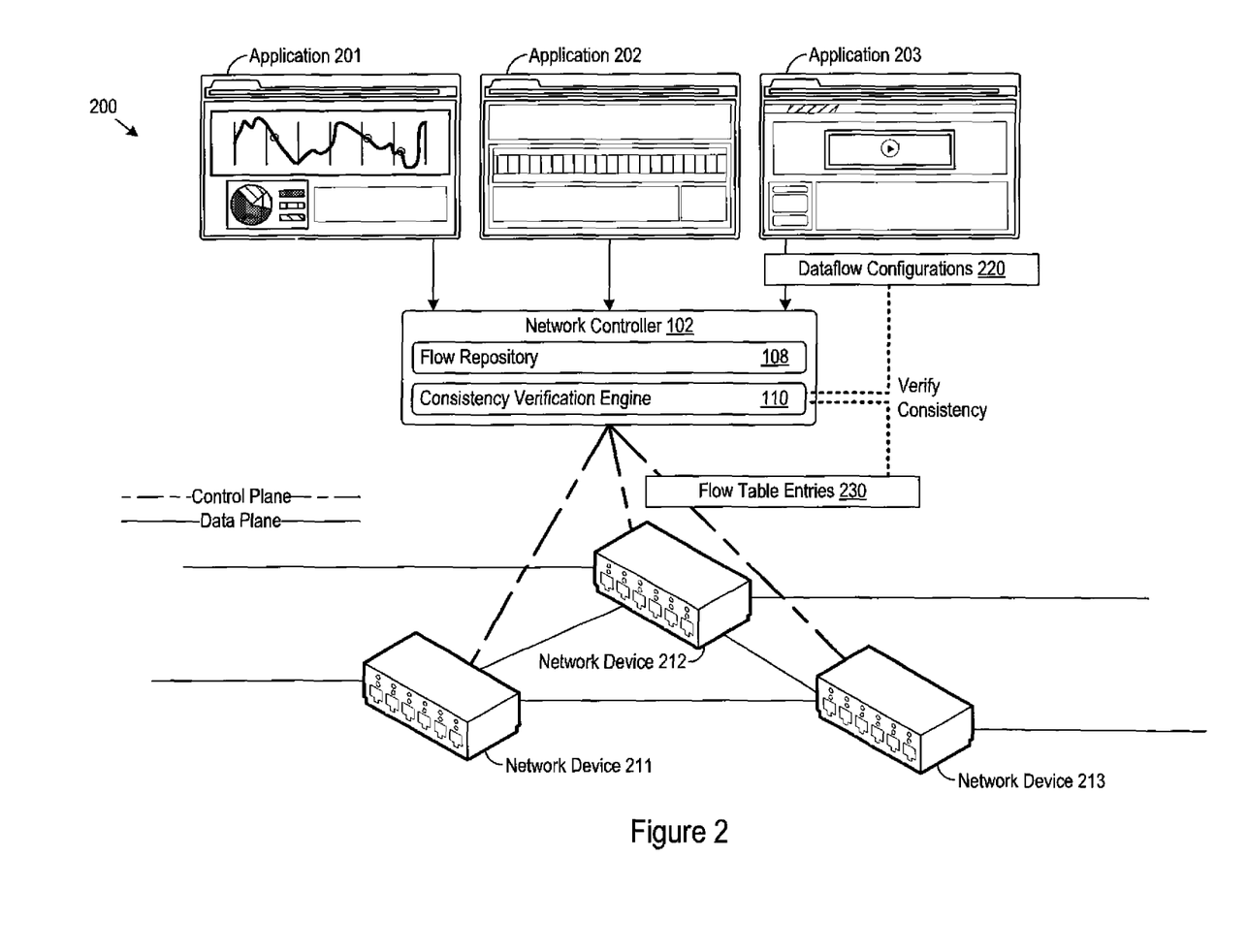
FIG. 2 shows an example of an architecture that includes a consistency verification engine to support dataflow consistency verification.

FIG. 2 shows an example of an architecture 200 that includes the consistency verification engine 110 to support dataflow consistency verification. The example architecture 200 shown in FIG. 2 includes an application layer with three applications, labeled as the applications 201, 202, and 203. The applications may be applications of any type or function, and in an SDN architecture, the applications 201, 202, and 203 may be referred to as SDN applications. The architecture 200 also includes the network controller 102, which in the example in FIG. 2 includes the flow repository 108 and the consistency verification engine 110.

The architecture 200 shown in FIG. 2 also includes the network devices 211, 212, and 213, which the network controller 102 may manage, controlling how network traffic is routed across the network devices 211, 212, and 213. The network devices 211, 212, and 213 may be switching devices or any other device that processes or routes network traffic across a communication network. The network controller 102 may configure the network devices 211, 212, and 213 through control plane communications, e.g., according to the OpenFlow protocol. Thus, network traffic (e.g., to and from the applications) may be routed by the network devices 211, 212, and 213 across a data plane.

The network controller 102 may receive a dataflow configuration 220 from an application, such as the application 203 in FIG. 2. As noted above, the dataflow configuration 220 may specify any number of requirements, constraints, characteristics, or configurations for network traffic such as a particular dataflow or set of dataflows. In particular, the dataflow configuration 220 specified by the application 203 may apply to a particular dataflow (or set of dataflows) received or transmitted by the application 203. The network controller 102 may store entries in the flow repository 108 for the dataflow configurations specified by multiple applications, such as the applications 201, 202, and 203.

In some examples, an application itself inserts an entry into the flow repository 108 for a specified dataflow configuration. In that regard, the network controller 102 may provide an interface (e.g., an application program interface (API)) by which SDN applications may create, read, update, or delete entries in the flow repository 108 for dataflow configurations specified by the applications. As an SDN application may determine the specific requirements and characteristics of network traffic communicated by the SDN application, the consistency verification engine 110 may aggregate the dataflow configurations specified by the applications in the flow repository 108, but may rely upon SDN applications themselves to specify, control, and update the particular dataflow configurations required by the SDN applications.

The dataflow configuration 220 may include various data fields to indicate the particular configuration elements specified by the dataflow configuration 220. Example data fields may include target network devices to effectuate (and thus, implement) the dataflow configuration 220 on, matching criteria for network traffic (e.g., that specifies a particular dataflow that the dataflow configuration 220 applies to), an action to perform for network traffic satisfying the matching criteria, and various other elements. In some implementations, the OpenFlow protocol provides a set of possible data fields that an application can populate in communicating the dataflow configuration 220, such as source or destination data fields (e.g., specified as IP addresses), ethertype fields, packet priority, or other matching criteria, packet forwarding or processing actions to perform, applicable time periods of the dataflow configuration 220, and more. The network controller 102 may implement the dataflow configuration 220 by configuring the network devices 211, 212, and 213 (as applicable) to process and forward network traffic according to the dataflow configuration 220.

The consistency verification engine 110 may verify that a network device configured to implement the dataflow configuration 220 actually does so. Put another way, the consistency verification engine 110 may verify that the flow table entries of a network device configured to implement the dataflow configuration 220 are actually present in flow tables of the network device. As such, the consistency verification engine 110 may perform a dataflow consistency verification after the dataflow configuration 220 is specified by the application 203 and after the initial implementation in the networking devices by the network controller 102.

To perform a dataflow consistency verification for the application 203, the consistency verification engine 110 may access the dataflow configurations 220 previously specified by the application 203, e.g., from the flow repository 108. As the application 203 may control the dataflow configurations 220 requested for network traffic communicated to or from the application 203, in some examples the consistency verification engine 110 queries the application 203 itself for the dataflow configurations 220 to receive an up-to-date or most recent version of the dataflow configurations 220. As another example, the consistency verification engine 110 may request the application 203 to update the dataflow configurations 220 in the flow repository 108, which may allow the consistency verification engine 110 to retrieve an updated version of the dataflow configurations 220 for verification.

In performing the dataflow consistency verification, the consistency verification engine 110 may also retrieve the flow table entries of network devices in the communication network that apply the dataflow configurations 220 of the application 203. In FIG. 2, the consistency verification engine 110 retrieves the flow table entries 230 from the network device 213. Then, the consistency verification engine 110 may identify whether an inconsistency exists between the dataflow configurations 220 accessed from the flow repository 108 (or application 203) and the flow table entries 230 retrieved from the network device 213. The consistency verification engine 110 may identify a inconsistency through a determination that the flow table entries 230 of the network device do not include an entry corresponding to at least one of the dataflow configurations 220 previously specified by the application 203.

In response to identifying an inconsistency, the consistency verification engine 110 may respond by logging the identified inconsistency, taking a corrective action to address the identified inconsistency, or both. As such, the consistency verification engine 110 may perform a dataflow consistency verification to ensure that the dataflow configurations 220 specified by the application 203 are implemented correctly by the network device 213 (for the specific dataflow configurations 220 implemented by the network device 213). The consistency verification engine 110 may likewise perform the dataflow consistency verification for other network devices in the communication network, such as for the specific dataflow configurations 220 implemented by the network devices 211 and 212 respectively. Thus, the consistency verification engine 110 may verify the consistency of any number of dataflow configurations previously specified by any number of applications of an application layer in an SDN architecture.

By performing the dataflow consistency verification subsequent to an initial implementation on managed network devices, the consistency verification engine 110 may account for implementation failures, lingering (and stale) flow table entries for crashed applications that inefficiently consume flow table resources, failure of table entry update or delete operations by the network controller 102, and various other scenarios by which an inconsistency may develop between the dataflow configurations specified by applications and the actual flow table entries of managed network devices. Dataflow consistency verifications by the consistency verification engine 110 may also protect against update failures for flow operations, e.g., failure to add a table entry corresponding to or updating a particular dataflow configuration in a flow table of a network device. Update failures may occur due to network failures, flow table overflow (e.g., when a flow table is full), channel starvation, and specification of an invalid dataflow for a particular network device. The consistency verification engine 110 may identify inconsistencies in the flow tables of network devices caused by any of these various scenarios and address the identified inconsistencies.

In some examples, the consistency verification engine 110 periodically performs the dataflow consistency verifications, thus verifying the network state with application requirements at various different times to account for update failures, application crashes, or other events that may cause an inconsistency between the dataflow configurations specified by SDN applications and flow table entries of the data layer network devices processing and routing the application network traffic. As another example, the consistency verification engine 110 may perform the dataflow consistency verifications at user-specified times, in response to certain network events (e.g., when a network device or application server reboots), or according to any other verification trigger criteria (e.g., when network bandwidth consumption exceeds a threshold amount in the aggregate or for a particular network device.

Figure 3:
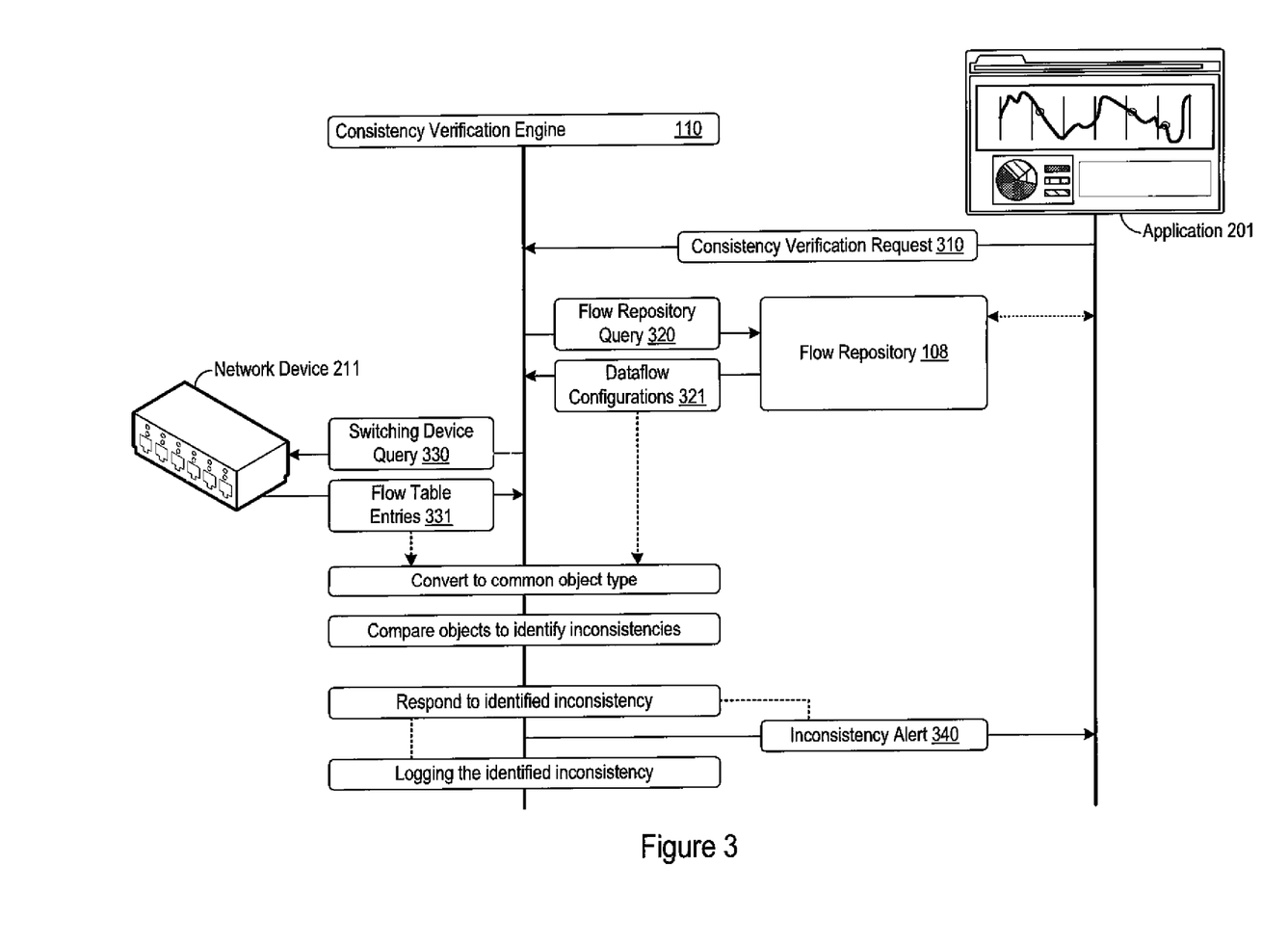
FIG. 3 shows an example of a dataflow consistency verification process that a consistency verification engine may perform.

FIG. 3 shows an example of a dataflow consistency verification process that the consistency verification engine 110 may perform. In particular, FIG. 3 illustrates an example dataflow consistency verification that the consistency verification engine 110 may perform for an application 201.

The consistency verification engine 110 may perform a dataflow consistency verification in response to receiving a consistency verification request 310 from the application 201. The consistency verification request 310 may take the form of any communication or message, and may indicate a request from the application 201 to subscribe to dataflow consistency verifications by the consistency verification engine 110. The consistency verification request 310 may request dataflow consistency verifications for the application 201 at a periodic rate, at on-demand times specified by the application 201, or both.

Consistency verification requests 310 may also be a mechanism by which the consistency verification engine 110 determines which applications to perform dataflow consistency verifications for. The consistency verification engine 110 may perform dataflow consistency verifications for the particular applications of an application layer from which a consistency verification request 310 has been received, but not for other applications of the application layer from which a consistency verification request 310 has not been received. As such, the consistency verification engine 110 may perform dataflow consistency verifications for some or all of the applications of an SDN application layer, depending on which applications provide a consistency verification request 310 to the consistency verification engine 110.

To perform the dataflow consistency verification for the application 201, the consistency verification engine 110 may retrieve both the dataflow configurations specified by the application 201 and the flow table entries of any network device that implements at least one of the dataflow configurations specified by the application 201. Thus, the consistency verification engine 110 may send a flow repository query 320 to the flow repository 108 (e.g., as a table query for any dataflow configurations previously specified by the application 201). As a response to the flow repository query 320, the consistency verification engine 110 may receive the dataflow configurations 321 previously specified by the application 201.

The consistency verification engine 110 may also send a network device query 330 to the network device 211, for example as a message communicated according to the OpenFlow protocol. The network device 211 may respond with with the flow table entries 313 presently implemented by the network device 211, which may allow the consistency verification engine 110 to ascertain how the network device 211 is configured to process and forward traffic. That is, the flow table entries 313 may indicate the dataflows that the network device is matching for, as each of the flow table entries 313 may correspond to a particular dataflow (e.g., via matching criteria) and specify the corresponding action to perform for network traffic of the particular dataflow.

The consistency verification engine 110 may detect an inconsistency between the dataflow configurations 321 and the flow table entries 331 when at least one of the dataflows configured in the dataflow configurations 321 does not have a corresponding entry among the flow table entries 331 of the network device 211. Put another way, the dataflow configurations 321 may specify a particular action to perform, traffic requirement to adhere to, or network route to communicate through for network traffic of a particular dataflow. An inconsistency may exist when the network device 211 does not include a flow table entry for the particular dataflow, and thus does not process or route network traffic of the particular dataflow according to the specified action, requirement, or network route. As another example, the consistency verification engine 110 may identify an inconsistency when the action, requirement, or network route specified in a dataflow configuration of the application 201 differs from the action, requirement, or network route indicated in a flow table entry among the flow table entries 331 that corresponds to the particular dataflow (e.g., with matching criteria than identifies the particular dataflow). In such a case, the network device 211 may identify the network traffic of the particular dataflow, but process or forward the identified network traffic differently or inconsistency with the dataflow configuration specified by the application 201.

To compare the retrieved dataflow configurations 321 and the flow table entries 331, the consistency verification engine 110 may convert the dataflow configurations 321 of the application 201 and the flow table entries of the network device 211 into a common object format. For example, the consistency verification engine 110 may convert the dataflow configurations 321 and the flow table entries 331 into the common object format by converting data fields of the dataflow configurations 321 to match a data format of the flow table entries 331 of the network device 211.

The OpenFlow protocol, for example, may provide a set of various data fields through which the application 201 may specify the dataflow configurations 321, and the consistency verification engine 110 may filter or parse the dataflow configurations 321 for the specific data fields that correspond to the data fields (or format) of the flow table entries 311 (e.g., source IP address, destination IP address, TCP addresses, communication protocols, ethertype fields, data fields corresponding to the tuple fields of a 5-tuple, or any other data field that identifies a dataflow). Then, the consistency verification engine 110 may compare the dataflow configurations 321 and flow table entries 331 converted into the common object format to identify an inconsistency (e.g., identify a missing entry among the flow table entries 311 or an entry with a corresponding action or other parameter that is inconsistent with a corresponding dataflow configuration).

To respond to an identified inconsistency, the consistency verification engine 110 may take a corrective action, such as by sending an inconsistency alert 340 to the application 201. The inconsistency alert 340 may be a message sent to the application 201, and may identify the network device 211 and dataflow configuration that is inconsistently (or not) applied by the network device 211. In response to receiving the inconsistency alert 340, the application 201 itself may initiate an update to the network controller 102, e.g., by sending a request to the network controller 102 to update the flow table entries of the network device 211 to include an entry corresponding to any of the dataflow configurations that the network device 211 does not implement or implements incorrectly. As another example of a corrective action, the consistency verification engine 110 itself may update the flow table entries of the network device 211, e.g., through any network device update mechanism supported by OpenFlow or another SDN protocol. The consistency verification engine 110 may additionally or alternatively log the identified consistency, e.g., for subsequent analysis or use.

As described above, the consistency verification engine 110 of a network controller 102 may support dataflow consistency verifications to ensure that the requested network traffic requirements and configurations are appropriately implemented on managed network devices of a communication network. As such, the consistency verification engine 110 may increase the efficiency and reliability of the communication network.

Through the features described herein, the consistency verification engine 110 may support increased flexibility in the specification of dataflow characteristics and requirements by SDN applications. For example, the consistency verification engine 110 may support application restriction of the placement of dataflows, allowing the applications to selecting a set of target devices to apply a dataflow configuration to. An SDN application may request, through a specified dataflow configuration, that a particular dataflow or set of dataflows target a specific network device, a group of network devices, or all network devices managed by the network controller 102, for example. The consistency verification engine 110 may verify that such dataflow restrictions are actually effectuated by the selected target network devices.

As another example, the consistency verification engine 110, through dataflow consistency verifications, may ensure that dataflow dependencies are met. For instance, an application may specify that dataflows F1 and F2 be part of a same dataflow group, and request that dataflows F1 and F2 be installed, effectuated, implemented, or removed from the same target network devices. The dataflow consistency verifications performed by the consistency verification engine 110 may ensure that such flow dependencies are actually implemented on the applicable target network devices, e.g., by verifying that the flow table entries of the target network devices include entries for both dataflows F1 and F2 as opposed to just one or none of the dataflows F1 and F2.

While a few examples have been described above, the consistency verification engine 110 may similarly verify that particular dataflow configurations specified by various applications of an application layer are properly effectuated by network devices of a communication network. The consistency verification engine 110 may thus provide and support dataflow consistency verifications in a communication network.

Figure 4:
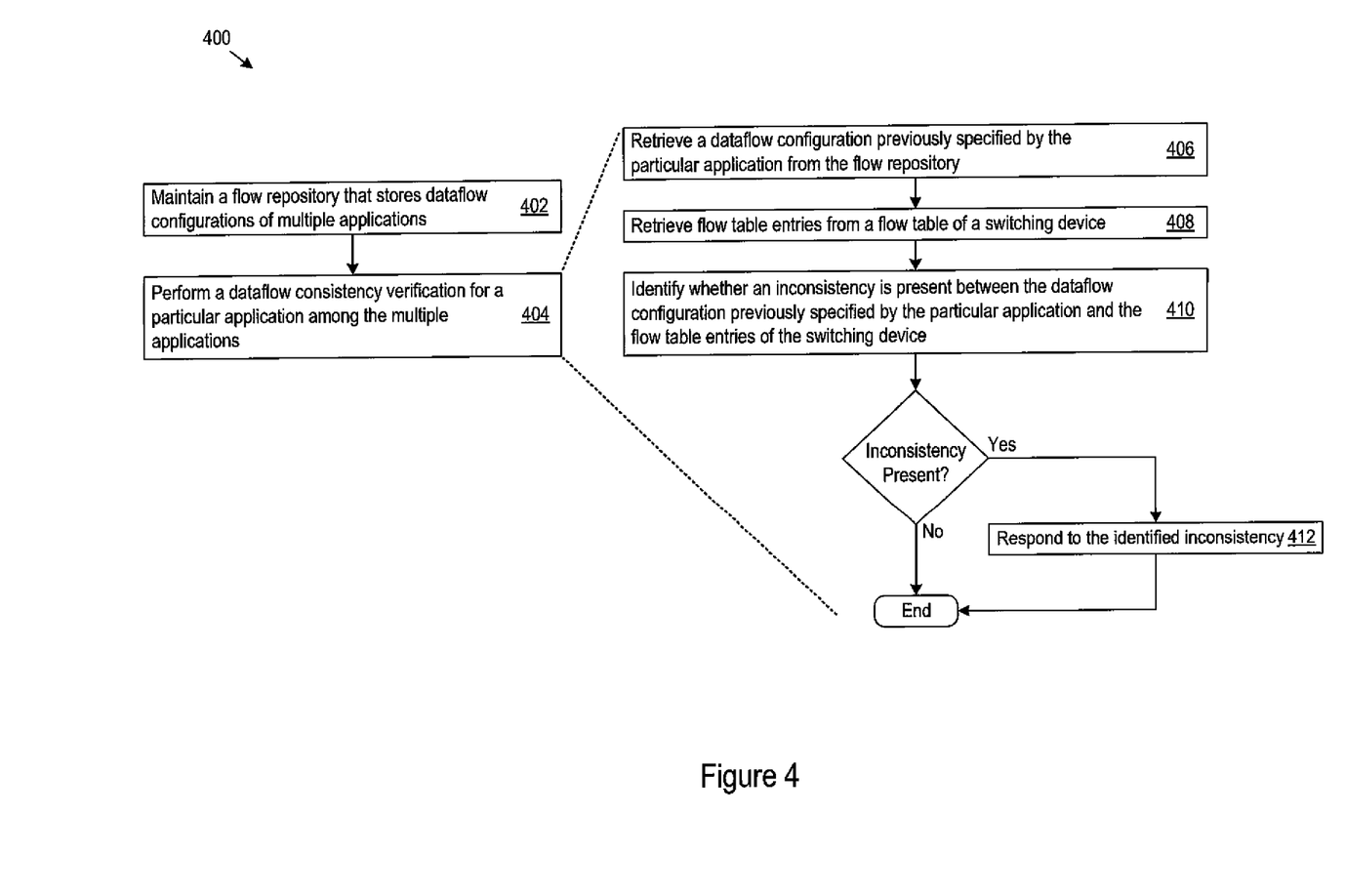
FIG. 4 shows an example of logic that a system or device may implement to support dataflow consistency verification

FIG. 4 shows an example of logic 400 that a system or device may implement to support dataflow consistency verification. The system 100, for instance, may implement the logic 400 as hardware, executable instructions stored on a machine-readable medium, or as combinations thereof. In some examples, the network controller 102 implements the logic 400 via the consistency verification engine 110, through which the network controller 102 may perform the logic 400 as a method or process to verify whether dataflow configurations specified by an application are consistent with the flow table entries implemented in network devices of a communication network.

The logic 400 may be implemented or performed by the consistency verification engine 110, and in doing so the consistency verification engine 110 may maintain a flow repository 108 that stores data flow configurations of multiple applications (402). The consistency verification engine 110 may also perform a dataflow consistency verification for a particular application among the multiple applications (404).

In performing the dataflow consistency verification, the consistency verification engine 110 may retrieve a dataflow configuration previously specified by the particular application from the flow repository 108 (406), retrieve flow table entries from a flow table of a network device (408), and identify whether an inconsistency is present between the dataflow configuration previously specified by the particular application and the flow table entries of the network device (410). To identify whether the inconsistency is present between the dataflow configuration and the flow table entries, the consistency verification engine 110 may determine that the flow table entries of the network device do not include an entry corresponding to the dataflow configuration previously specified by the application.

When the inconsistency is present, the consistency verification engine 110 may respond to the identified inconsistency (412), for example by logging the identified inconsistency, taking a corrective action to address the identified inconsistency, or both. In taking the corrective action to address the identified inconsistency, the consistency verification engine 110 may alert the particular application to update the flow table entries of the network device to include an entry that corresponds to the dataflow configuration. As another example, the consistency verification engine 110 may take corrective action by itself adding an entry corresponding to the dataflow configuration into a flow table of the network device.

In some examples, the consistency verification engine 110 may implement or perform the logic 400 further to receive a consistency verification request from the particular application, and, in response, periodically performing the dataflow consistency verification for the particular application. As another example, the consistency verification engine 110 may implement or execute the logic 400 further to determine not to perform a dataflow consistency verification for any of the multiple applications from which a consistency verification request has not been received by the network controller 102.

Figure 5:
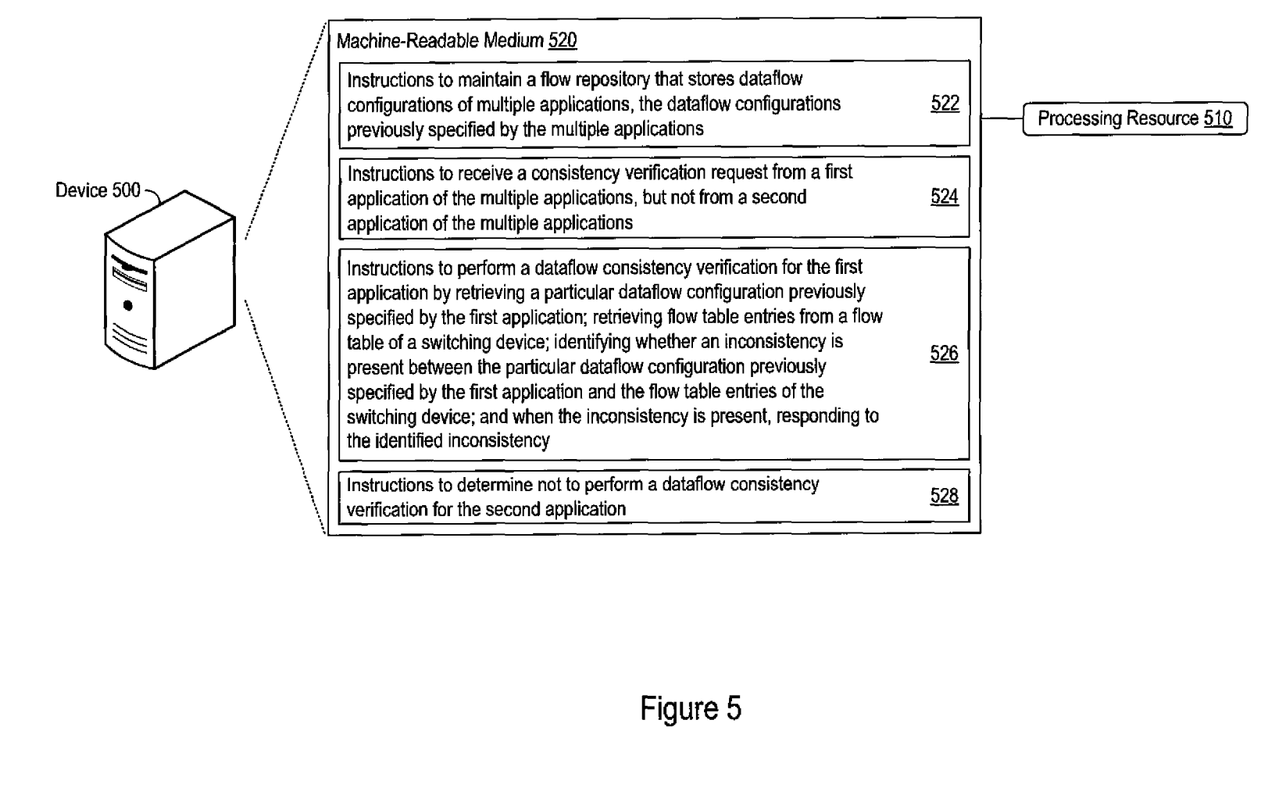
FIG. 5 shows an example of a device that supports dataflow consistency verification.

FIG. 5 shows an example of a device 500 that supports dataflow consistency verification. The device 500 may include a processing resource 510, which may take the form of a single or multiple processors. The processor(s) may include a central processing unit (CPU), microprocessor, or any hardware device suitable for executing instructions stored on a machine-readable medium, such as the machine-readable medium 520 shown in FIG. 5. The machine-readable medium 520 may take the form of any non-transitory electronic, magnetic, optical, or other physical storage device that stores executable instructions, such as the instructions 522, 524, 526, and 528 shown in FIG. 5. As such, the machine-readable medium 520 may be, for example, Random Access Memory (RAM) such as dynamic RAM (DRAM), flash memory, memristor memory, spin-transfer torque memory, an Electrically-Erasable Programmable Read-Only Memory (EEPROM), a storage drive, an optical disk, and the like.

The device 500 may execute instructions stored on the machine-readable medium 520 through the processing resource 510. Executing the instructions may cause the device 500 to perform any of the features described herein, including according to any features of the network controller 102, including the consistency verification engine 110. For example, execution of the instructions 522, 524, 526, and 528 by the processing resource 510 may cause the device 500 to maintain a flow repository that stores dataflow configurations of multiple applications (instructions 522), the dataflow configurations previously specified by the multiple applications; receive a consistency verification request from a first application of the multiple applications, but not from a second application of the multiple applications (instructions 524); perform a dataflow consistency verification for the first application by retrieving a dataflow configuration previously specified by the first application, retrieving flow table entries from a flow table of a network device, identifying whether an inconsistency is present between the dataflow configuration previously specified by the first application and the flow table entries of the network device, and when the inconsistency is present, responding to the identified inconsistency (instructions 526); and determine not to perform a dataflow consistency verification for the second application (instructions 528).

In some examples, the instructions are executable by the processing resource 510 to identify the inconsistency through a determination that the flow table entries of the network device do not include an entry for the dataflow previously specified by the first application.

The systems, methods, devices, and logic described above, including the network controller 102 and the consistency verification engine 110, may be implemented in many different ways in many different combinations of hardware, logic, circuitry, and executable instructions stored on a machine-readable medium. For example, the network controller or the consistency verification engine 110 may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the network controller, including the consistency verification engine 110.

The processing capability of the systems, devices, and engines described herein, including network controller 102 and the consistency verification engine 110, may be distributed among multiple system components, such as among multiple processors and memories, optionally including multiple distributed processing systems. Parameters, databases, and other data structures, such as the flow repository 108, may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A network controller comprising:
a flow repository that stores dataflow configurations of multiple applications previously specified by multiple applications;
a consistency verification engine to:
determine not to perform a dataflow consistency verification for any of the multiple applications from which a consistency verification request has not been received by the network controller;
perform a dataflow consistency verification for a particular application among the multiple applications by:
retrieving a dataflow configuration previously specified by the particular application from the flow repository;
retrieving flow table entries from a flow table of a network device;
identifying an inconsistency between the dataflow configuration previously specified by the application and the flow table entries of the network device; and
responding to the identified inconsistency.

2. The network controller of claim 1, wherein the consistency verification engine is to identify the inconsistency through a determination that the flow table entries of the network device do not include an entry corresponding to the dataflow configuration previously specified by an application.

3. The network controller of claim 1, wherein the consistency verification engine is to identify the inconsistency by:
converting the dataflow configuration accessed from the flow repository and the flow table entries retrieved from the network device into a common object format; and
comparing the dataflow configuration and flow table entries converted into the common object format to identify the inconsistency.

4. The network controller of claim 3, wherein the consistency verification engine is to convert the dataflow configuration and the flow table entries into the common object format by converting data fields of the dataflow configuration to match a data format of the flow table entries of the network device.

5. The network controller of claim 1, wherein the consistency verification engine is further to maintain the flow repository to include flow configurations of the multiple applications.

6. The network controller of claim 1, wherein the consistency verification engine is to respond to the identified inconsistency by logging the identified inconsistency, taking a corrective action to address the identified inconsistency, or both.

7. The network controller of claim 6, wherein the consistency verification engine is to take the corrective action to address the identified inconsistency by alerting the particular application to update the table flow table entries of the network device to include an entry that corresponds to the dataflow configuration.

8. A method comprising:
through a network controller:
maintaining a flow repository that stores dataflow configurations of multiple applications, the dataflow configurations previously specified by the multiple applications;
determining not to perform a dataflow consistency verification for any of the multiple applications from which a consistency verification request has not been received by the network controller;
performing a dataflow consistency verification for a particular application among the multiple applications by:
retrieving a dataflow configuration previously specified by the particular application from the flow repository;
retrieving flow table entries from a flow table of a network device;
identifying whether an inconsistency is present between the dataflow configuration previously specified by the particular application and the flow table entries of the network device; and
when the inconsistency is present, responding to the identified inconsistency.

9. The method of claim 8, further comprising receiving a consistency verification request from the particular application; and, in response, periodically performing the dataflow consistency verification for the particular application.

10. The method of claim 8, wherein identifying whether the inconsistency is present between the dataflow configuration and the flow table entries comprises determining that the flow table entries of the network device do not include an entry corresponding to the dataflow configuration previously specified by the application.

11. The method of claim 8, wherein responding to the identified inconsistency comprises logging the identified inconsistency, taking a corrective action to address the identified inconsistency, or both.

12. The method of claim 11, wherein taking the corrective action to address the identified inconsistency comprises alerting the particular application to update the flow table entries of the network device to include an entry that corresponds to the dataflow configuration.

13. A non-transitory machine-readable medium comprising instructions executable by a processing resource to:
maintain a flow repository that stores dataflow configurations of multiple applications, the dataflow configurations previously specified by the multiple applications;
receive a consistency verification request from a first application of the multiple applications, but not from a second application of the multiple applications;
perform a dataflow consistency verification for the first application by:
retrieving a particular dataflow configuration previously specified by the first application;
retrieving flow table entries from a flow table of a network device;
identifying whether an inconsistency is present between the particular dataflow configuration previously specified by the first application and the flow table entries of the network device; and
when the inconsistency is present, responding to the identified inconsistency; and
determine not to perform a dataflow consistency verification for the second application.

14. The non-transitory machine-readable medium of claim 13, wherein the instructions are executable to identify the inconsistency through a determination that the flow table entries of the network device do not include an entry corresponding to the particular dataflow configuration previously specified by the application.

15. The non-transitory machine-readable medium of claim 13, wherein identifying whether the inconsistency is present between the particular dataflow configuration and the flow table entries comprises determining that the flow table entries of the network device do not include an entry corresponding to the particular dataflow configuration previously specified by the first application.

16. The non-transitory machine-readable medium of claim 13, wherein responding to the identified inconsistency comprises logging the identified inconsistency, taking a corrective action to address the identified inconsistency, or both.

17. The non-transitory machine-readable medium of claim 16, wherein taking the corrective action to address the identified inconsistency comprises alerting the first application to update the flow table entries of the network device to include an entry that corresponds to the dataflow configuration.

* * * * *